US009808956B2

(12) United States Patent
Sun et al.

(10) Patent No.: US 9,808,956 B2
(45) Date of Patent: Nov. 7, 2017

(54) EXTENSION RECYCLING METHOD BY THE TECHNOLOGY OF BAR EMBEDMENT WITH GLUE FOR WOOD COLUMNS AND APPARATUS THEREOF

(71) Applicant: International Center for Bamboo and Rattan, Beijing (CN)

(72) Inventors: Zhengjun Sun, Beijing (CN); Zhijia Liu, Beijing (CN); Yan Yan, Beijing (CN); Huanrong Liu, Beijing (CN); Weifeng Guo, Beijing (CN); Yujing Nie, Beijing (CN); Xiubiao Zhang, Beijing (CN)

(73) Assignee: INTERNATIONAL CENTER FOR BAMBOO AND RATTAN, Beijing (CN)

( * ) Notice: Subject to any disclaimer, the term of this patent is extended or adjusted under 35 U.S.C. 154(b) by 0 days.

(21) Appl. No.: 14/041,673

(22) Filed: Sep. 30, 2013

(65) Prior Publication Data
US 2014/0133902 A1 May 15, 2014

(30) Foreign Application Priority Data
Nov. 2, 2012 (CN) .......................... 2012 1 0432523

(51) Int. Cl.
*B29C 65/00* (2006.01)
*B27M 3/00* (2006.01)
(Continued)

(52) U.S. Cl.
CPC ............. *B27M 3/002* (2013.01); *B29C 65/48* (2013.01); *B29C 65/564* (2013.01);
(Continued)

(58) Field of Classification Search
CPC . B29C 66/72329; B29C 65/48; B29C 65/564; B29C 66/02241; Y10T 56/1052; Y10T 56/1066; Y10T 56/1339
(Continued)

(56) References Cited

U.S. PATENT DOCUMENTS 3,788,372 A * 1/1974 Terenzoni ...................... 144/350
5,320,152 A * 6/1994 Ganley .......................... 144/352
(Continued)

*Primary Examiner* — Mark A Osele
*Assistant Examiner* — Nikolas Harm
(74) *Attorney, Agent, or Firm* — Muncy, Geissler, Olds & Lowe, P.C.

(57) ABSTRACT

The present invention relates to an extension recycling method by the technology of bar embedment with glue for wood columns and an apparatus thereof, the method comprising: classification of short wood, sawing of short wood, drying of short wood, assembling and sorting of short wood, connection in series of short wood under pressure, processing of short wood, and marking of stand columns. The apparatus is a short wood connection machine comprising a main body, rotating rollers, pressing cylinders, pressing plates and a planing frame. By using the present method, short wood can be connected into a strut, so that the abandoned short wood can be recycled to save natural resources. Due to the apparatus and the connecting member of the present invention, the process of connecting short wood into a strut can be completed conveniently, which have the advantages of simple structure, convenient processing and easy manufacturing.

3 Claims, 2 Drawing Sheets

(51) Int. Cl.
  *B29C 65/48* (2006.01)
  *B29C 65/56* (2006.01)
(52) U.S. Cl.
  CPC .. *B29C 66/02241* (2013.01); *B29C 66/72329* (2013.01); *Y10T 156/12* (2015.01); *Y10T 403/477* (2015.01)
(58) Field of Classification Search
  USPC ........ 156/304.1, 304.3, 304.2, 64, 510, 159, 156/258, 264, 266, 512, 354, 288, 295
  See application file for complete search history.

(56) References Cited

U.S. PATENT DOCUMENTS

| | | | |
|---|---|---|---|
| 6,224,704 B1* | 5/2001 | Bassett et al. | 156/182 |
| 6,279,629 B1* | 8/2001 | Sing | 144/347 |
| 6,358,352 B1* | 3/2002 | Schmidt | 156/254 |
| 6,701,984 B2* | 3/2004 | Lamontagne et al. | 144/347 |
| 6,811,647 B1* | 11/2004 | Graf et al. | 156/264 |
| 2003/0010434 A1* | 1/2003 | Grenier | 156/264 |
| 2006/0054267 A1* | 3/2006 | Bosson | 156/64 |
| 2011/0165353 A1* | 7/2011 | Chow | 428/35.6 |
| 2012/0237291 A1* | 9/2012 | Friesen | 403/375 |

\* cited by examiner

EXTENSION RECYCLING METHOD BY THE TECHNOLOGY OF BAR EMBEDMENT WITH GLUE FOR WOOD COLUMNS AND APPARATUS THEREOF

TECHNICAL FIELD

The present invention relates to an extension recycling method by the technology of bar embedment with glue for wood columns and an apparatus thereof.

BACKGROUND OF THE INVENTION

The distribution area of standing timbers is small in China, thus it is quite short of building materials. However, in enterprises such as forest farms and timber processing plants using entire timbers, there are a large volume of short wood left behind after the desired timbers are cut for use. Because the short wood are short, instead of serving as building materials, they are usually stacked as waste materials, or used as fuel wood, or left to decay. Consequently, the precious natural resources cannot be utilized effectively, and severe waste is caused.

SUMMARY OF THE INVENTION

The purpose of the present invention is to provide an extension recycling method by the technology of bar embedment with glue for wood columns. By using the method, short wood can be connected into a strut, so that the abandoned short wood can be recycled to save natural resources.

The other purpose of the present invention is to provide an apparatus for connecting short wood into a strut at one time. By using such apparatus, the process of connecting short wood into a strut can be completed conveniently, which has the advantages of simple structure, convenient processing and easy manufacturing.

For these purposes, the extension recycling method by the technology of bar embedment with glue for wood columns comprises:

(1) classification of short wood: classifying short wood according to the species hardness, explicitly recording the upper-end diameter, the lower-end diameter as well as the length of the short wood, and removing the short wood that have been mildewed, damaged by worms and bent overall by over 1%;

(2) sawing of the short wood: horizontally cutting 2-20 mm from the upper end surface and the lower end surface of the short wood by using a circular saw, the cross-sections being horizontal planes;

(3) drying of the short wood: drying the short wood naturally or artificially until the moisture content of the short wood is reduced to 10%, the temperature for the artificial drying being 80° C.;

(4) assembling and sorting of the short wood: assembling and sorting the short wood according to actual demands, including connection in series of short wood that the connecting surfaces of two adjacent pieces have a same diameter or diameters with a difference less than 5%;

assembling in series multiple pieces of short wood of same species hardness; and assembling in series multiple pieces of short wood of different species hardness, and using the short wood of high species hardness as the short wood at the lower end of a manufactured strut while the short wood of low species hardness as the short wood at the upper end of the manufactured strut;

(5) connection in series of the short wood under pressure: placing the plurality of the assembled pieces of short wood on the rotating rollers of the connecting machine, gluing the connecting surfaces of the two connected adjacent pieces of short wood, then placing the connecting members on the connecting surfaces of the two adjacent pieces of short wood and applying a pressure to the two ends of the assembled pieces of short wood from the left and right ends of the rotating roller by using a press machine until the connecting surfaces of the two adjacent pieces of short wood tightly fit with each other and the two sides of the connecting members are fixedly inserted into the connecting surfaces of the two pieces of short wood;

(6) processing of the short wood: starting the short wood connection machine to allow the stand column formed by in series connecting the short wood to be processed to rotate coaxially, and planing the stand column formed by in series connecting the short wood to a designed diameter size by a horizontally sliding planer tool; and (7) marking of the stand column: taking the stand column out from the short wood connection machine and marking information about its assembly, species, length and width on a side thereof, thus to form a stand column.

The short wood is 0.5-2 m in length. The glue is bi-component epoxy resin glue, biphenol A epoxy resin glue, or latex.

An apparatus for implementing the method described above is provide, the apparatus being a short wood connection machine comprising a main body, rotating rollers, pressing cylinders, pressing plates and a planing frame. The two rotating rollers are spaced apart and disposed in parallel in the middle of the main body. Ends of the two rotating rollers are driven by a synchronous motor. The pressing cylinders are located on the main body between the two rotating rollers except for the two outer sides of the main body, and the cylinder piston rods thereof are connected with the middle of the rear side of the pressing plates. A slide rail for the parallel movement of the movable planing frame and the axes of the rotating rollers is provided on one side of the main body. The movable planing frame is constructed on the slide rail. A screw, for driving the movable planing frame to move, is provided on the main body located at the upper end of the slide rail. The movable planing frame is connected with the screw by threads. One end of the screw is driven by a control motor. A planer tool is provided on the movable planing frame.

The planer tool is placed on a planer tool adjustment stand at the upper end of the movable planing frame.

A connecting member for implementing the method described above is provided, comprising a load-bearing plate which is provided with a connecting rod nail perpendicular to a plane of the load-bearing plate in the middle of its two ends, respectively. The top of the connecting rod nails is sharp and the diameter of the load-bearing plate is 4-20 cm.

The above structural design achieves the purposes of the present invention.

By using the method of the present invention, short wood can be connected into a strut, so that the abandoned short wood can be recycled to save natural resources.

Due to the apparatus and the connecting member of the present invention, the process of connecting short wood into a strut can be completed conveniently at one time, which have the advantages of simple structure, convenient processing and easy manufacturing, specifically as follows.

(1) In the present invention, multiple pieces of short wood can be connected in series into building materials (stand columns) at one time, so that the abandoned materials can be recycled effectively. Correspondingly, a lot of natural resources can be saved and the number of the logged standing timbers can be reduced effectively, so serious damage to the ecological environment is avoided.

(2) The length of the manufactured stand columns of the present invention is determined according to actual demands and free of restrictions on length and thickness of wood, thus the utilization of the timbers is increased. The manufactured main columns have same vertical compression strength and service life as the stand columns manufactured from timbers of same diameter, but cost 60% lower than that of the stand columns manufactured from timbers of same diameter.

(3) The apparatus of the present invention requires less investment with quick return. The apparatus may manufacture multiple pieces of short wood into a stand column at one time, and is characterized by long service life, low maintenance cost, long-term benefits from onetime investment, high production efficiency, significant improvement of economic benefits, and easy popularization.

DETAILED DESCRIPTION OF THE INVENTION

An extension recycling method by the technology of bar embedment for wood columns comprises:

(1) classification of short wood: classifying short wood according to the species hardness of short wood, explicitly recording the upper-end diameter, the lower-end diameter as well as the length of the short wood, and removing the short wood that have been mildewed, damaged by worms and bent overall by over 1%;

(2) sawing of the short wood: horizontally cutting 2-20 mm from the upper end surface and the lower end surface of the short wood by using a circular saw, the cross-sections being horizontal planes;

(3) drying of the short wood: drying the short wood naturally or artificially until the moisture content of the short wood is reduced to 10%, the temperature for the artificial drying being 80° C.;

(4) assembling and sorting of the short wood: assembling and sorting the short wood according to actual demands, including connection in series of the short wood that the connecting surfaces of two adjacent pieces have a same diameter or diameters with a difference less than 5%;

assembling in series multiple pieces of short wood of same species hardness; and assembling in series multiple pieces of short wood of different species hardness, and using the short wood of high species hardness as the short wood at the lower end of a manufactured strut while the short wood of low species hardness as the short wood at the upper end of the manufactured strut;

(5) connection in series of the short wood under pressure: placing the plurality of the assembled pieces of short wood on the rotating rollers of the connecting machine gluing the connecting surfaces of the two connected adjacent pieces of short wood, then placing the connecting member on the connecting surfaces of the two adjacent pieces of short wood and applying a pressure to the two ends of the assembled pieces of short wood from the left and right ends of the rotating roller by using a press machine until the connecting surfaces of the two adjacent pieces of short wood tightly fit with each other and the two sides of the connecting members are fixedly inserted into the connecting surfaces of the two pieces of short wood;

(6) processing of the short wood: starting the short wood connection machine to allow the stand column formed by in series connecting the short wood to be processed to rotate coaxially, and planing the stand column formed by in series connecting the short wood to a designed diameter size by a horizontally sliding planer tool; and (7) marking of the stand column: taking the stand column out from the short wood connection machine and marking information about its assembly, species, length and width on a side thereof, thus to form a stand column.

The short wood is 0.5-2 m in length. The glue is bi-component epoxy resin glue, biphenol A epoxy resin glue, or latex.

Figure 1:
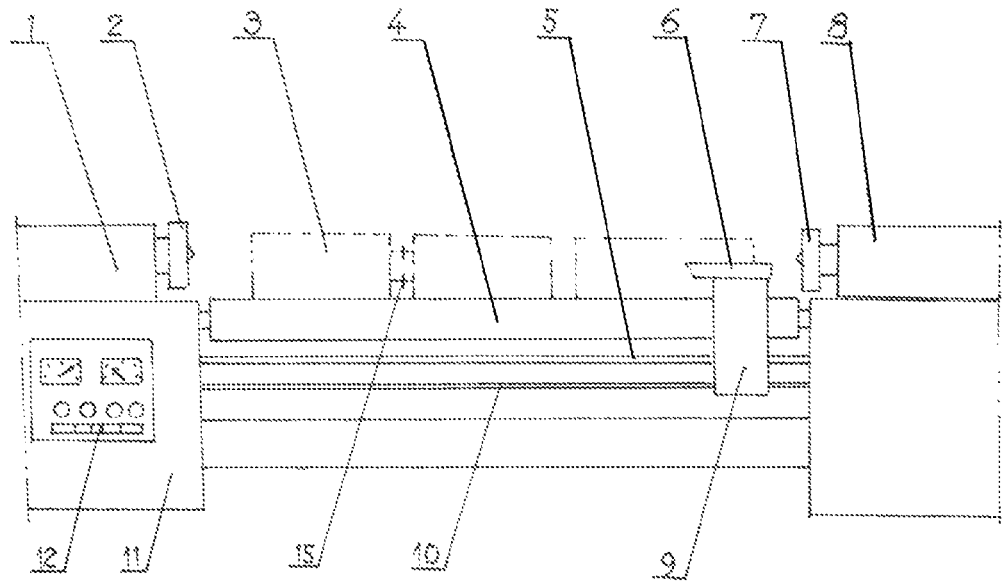
FIG. 1 is a structure diagram of an apparatus according to the present invention.
Figure 2:
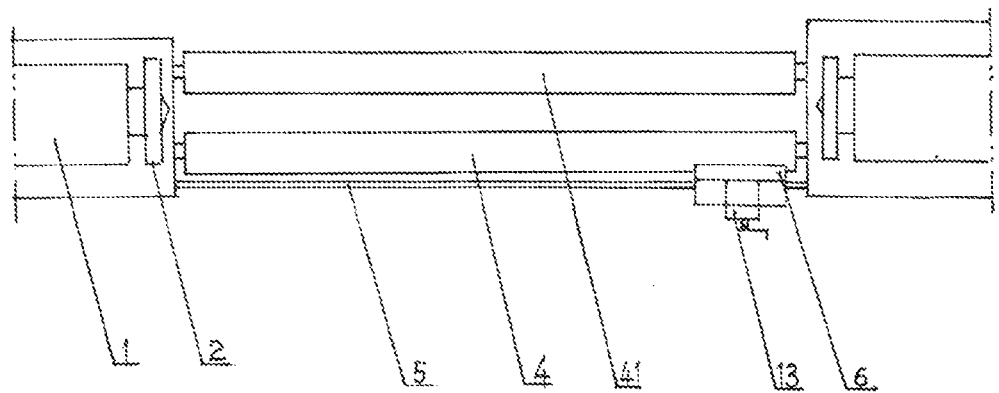
FIG. 2 is a structure diagram of an apparatus according to the present invention in a top view.

As shown in FIG. 1 and FIG. 2, an apparatus for implementing the method described above is provided, the apparatus being a short wood connection machine. The short wood connection machine comprises a main body 11, rotating rollers, pressing cylinders, pressing plates and a planing frame. The two rotating rollers 4 and 41 are spaced apart and disposed in parallel in the middle of the main body. One end of the two rotating rollers is driven by a synchronous motor while the other end of the two rotating rollers is connected to the axes of the main body. The synchronous motor is located inside a corresponding main body and may be controlled by a control circuit disposed inside a control cabinet 12 that is on one side of the main body. Control instruments and buttons are disposed on the control cabinet panel.

The pressing cylinders 1 and 8 are located on the main body between the two rotating rollers except for the two outer sides of the main body. The cylinder piston rods of the cylinders are connected with the middle of the rear side of the pressing plates 2 and 7, i.e. the cylinder piston rod of the pressing cylinder 1 on the left side of the main body is connected with the middle of the rear side of the pressing plate 2, while the the cylinder piston rod of the pressing cylinder 8 on the right side of the main body is connected with the middle of the rear side of the pressing plate 7. A slide rail 10 for the parallel movement of the movable planing frame 9 and the axes of the rotating rollers is provided on one side of the main body. A screw 5 for driving the movable planing frame to move is provided on the main body located at the upper end of the slide rail. The movable planing frame is connected with the screw by threads. One end of the screw is driven by a control motor. A planer tool 6 is provided on the movable planing frame. The control motor is controlled by the control circuit inside the control cabinet that is on one side of the main body. The control circuit is controlled by a computer.

The planer tool is placed on the planer tool adjustment stand 13 located at the upper end of the movable planing frame. The planer tool adjustment stand may control the depth of the stand column cut by the planer tool. The planer tool is a conventional device, thus it will not be described herein again.

Figure 3:
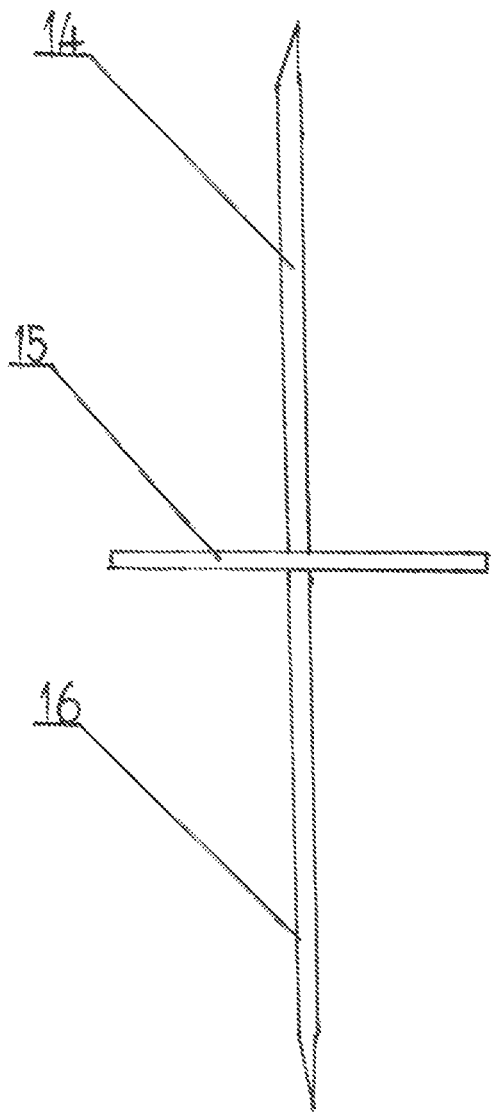
FIG. 3 is a structure diagram of a connecting member according to the present invention.

As shown in FIG. 3, a connecting member for implementing the method described above is provided, comprising a load-bearing plate 15 which is provided with a connecting rod nail 14 and 16 perpendicular to a plane of the load-bearing plate in the middle of its two ends, respectively. The top of the connecting rod nails is sharp and the diameter of the load-bearing plate is 4-20 cm.

During manufacturing, the short wood are classified according to the species hardness, the upper-end diameter, the lower-end diameter, and the length of the short wood are explicitly recorded, and the short wood that have been mildewed, damaged by worms and bent overall by over 1% are removed. For example, the species of high hardness comprise jujube trees, locust trees, oak trees and etc., while the species of low hardness comprise poplars, willows and etc.

2-20 mm of the short wood is horizontally cut from the upper end surface and the lower end surface of the short wood by using a circular saw, and the cross-sections are horizontal planes to be helpful for connection in series.

The short wood are dried naturally or artificially until the moisture content of the short wood is reduced to 10%, and the temperature for the artificial drying is 80° C.;

The short wood are assembled and sorted according to actual demands, and the short wood are assembled in series in such a way that the connecting surfaces of two adjacent pieces of short wood have a same diameter or diameters with a difference less than 5%, comprising:

multiple pieces of short wood of same species hardness are assembled in series. For example, multiple pieces of short wood cut from locust trees are connected in series.

Multiple pieces of short wood of different species hardness are assembled in series, and the short wood of high species hardness are used as the short wood at the lower end of a manufactured strut while the short wood of low species hardness are used as the short wood at the upper end of the manufactured strut. For example, when multiple pieces of short wood respectively cut from oak trees and locust trees are assembled in series, the short wood cut from oak trees should be used as the short wood at the lower end of the manufactured strut.

The short wood are connected in series under pressure. The multiple assembled pieces of short wood 3 are placed on the rotating rollers of the short wood connection machine. It should be ensured that the multiple pieces of short wood are coaxial, i.e. the multiple pieces of short wood placed between the two rotating rollers are coaxial. For example, calibration will be performed by gaskets if not coaxial. The connecting surfaces of the two connected adjacent pieces of short wood are glued, and the connecting members are then placed on the connecting surfaces of the two adjacent pieces of short wood. Usually, 2 to 4 connecting members spaced apart are placed on the connecting surfaces of the two adjacent pieces of short wood. The axes of the connecting rod nails on the connecting members should be parallel to the axial line of the short wood.

The pressing cylinders at the left and right ends of the rotating rollers are turned on. The cylinder piston rods of the two pressing cylinders move inward with respect to each other and drive the pressing plates to press the end surfaces of the two pieces of short wood at the front and rear ends of the stand column, so that the connecting surfaces of the two adjacent pieces of the multiple pieces of short wood are pressed against and fit with each other. During this process, the connecting rod nails of the connecting members are pierced into the connecting surfaces of the two adjacent pieces of short wood, to play a role in fastening the two adjacent pieces of short wood. The load-bearing plate of each of the connecting members balances the piercing depth of the connecting rod nails and the bearing capacity of the two pieces of short wood.

The pressing cylinders apply a pressure to the two ends of the assembled pieces of short wood by the cylinder piston rods and the pressing plates, until the connecting surfaces of the two adjacent pieces of short wood tightly fit with each other and the two sides of the connecting members are fixedly inserted into the connecting surfaces of the two pieces of short wood. Whereby, the molding of a stand column is completed at one time.

The short wood are processed. The rotating rollers of the short wood connection machine are turned on to allow the stand column formed by in series connecting the short wood to be processed to rotate coaxially (or driven to rotate by the pressing plates due to the press force of the pressing plates). The planing depth of the planer tool on the movable planing frame is adjusted. The screw is driven to rotate by a motor controlled by computer programs, to allow the movable planing frame at the upper end of the slide rail to move. The planer tool horizontally sliding planes the stand column formed by in series connecting the short wood to a designed diameter size and planes the surface of the stand column smooth. So far, the planing process of the stand column is completed.

The stand column is marked. The stand column is taken out from the short wood connection machine, and then marked with information about its assembly, species, length and width on a side thereof, thus to form a stand column.

In short, by using the method of the present invention, short wood can be connected into a strut, so that the abandoned short wood can be recycled to save natural resources. Due to the apparatus and the connecting member of the present invention, the process of connecting short wood into a strut can be completed conveniently, which have the advantages of simple structure, convenient processing and easy manufacturing.

The invention claimed is:

1. An extension recycling method by the technology of bar embedment with glue for wood columns, comprising,
   (1) classification of short wood: classifying short wood according to a species hardness, explicitly recording an upper-end diameter, a lower-end diameter as well as a length of the short wood, and removing any short wood that have been mildewed, damaged by worms and bent;
   (2) sawing of the short wood: horizontally cutting 2-20 mm from an upper end surface and a lower end surface of the short wood by using a circular saw, cross-sections thereof being horizontal planes;
   (3) drying of the short wood: drying the short wood naturally or artificially until a moisture content of the short wood is reduced to 10%, a temperature for the artificial drying being 80° C.;
   (4) assembling and sorting of the short wood: assembling and sorting the short wood, including connection in series of the short wood that connecting surfaces of two adjacent pieces have a same diameter or diameters with a difference less than 5%;
   assembling in series multiple pieces of short wood of same species hardness; and
   assembling in series multiple pieces of short wood of different species hardness, and using the short wood of a first species hardness as the short wood at a lower end of a manufactured strut while the short wood of a second species hardness as the short wood at an upper end of the manufactured strut, wherein the first species hardness is greater than the second species hardness;

(5) connection in series of the short wood under pressure: placing the assembled multiple pieces of short wood on rotating rollers of a connecting machine, gluing the connecting surfaces of two connected adjacent pieces of short wood, then placing the connecting members on the connecting surfaces of the two adjacent pieces of short wood and applying a pressure to two ends of the assembled pieces of short wood from left and right ends of the rotating rollers by using a press machine until the connecting surfaces of the two adjacent pieces of short wood fit with each other and two sides of the connecting members are fixedly inserted into the connecting surfaces of the two pieces of short wood;

(6) processing of the short wood: starting a short wood connection machine to allow a stand column formed by in series connecting the short wood to be processed to rotate coaxially, and planing the stand column formed by in series connecting the short wood to a designed diameter size by a horizontally sliding planer tool; and (7) marking of the stand column: taking the stand column out from the short wood connection machine and marking information about its assembly, species, length and width on a side thereof, thus to form a stand column.

2. The method according to claim 1, wherein the length of the short wood is 0.5-2 m.

3. The method according to claim 1, wherein, the glue is bi-component epoxy resin glue, bisphenol A epoxy resin glue, or latex.

* * * * *